DELAY LINE TIMING PULSE GENERATOR

Filed Oct. 23, 1965

INVENTORS.
CHARLES P. GERRARD
BY JOSEPH REESE BROWN, JR.
Christie, Parker & Hale
ATTORNEYS.

United States Patent Office 3,386,036

Patented May 28, 1968

3,386,036
DELAY LINE TIMING PULSE GENERATOR

Charles P. Gerrard and Joseph Reese Brown, Jr., Pasadena, Calif., assignors to Burroughs Corporation, Detroit, Mich., a corporation of Michigan Filed Oct. 23, 1965, Ser. No. 503,333
4 Claims. (Cl. 328—56)

This invention relates to generating of timing pulses and, more particularly, to an improved timing pulse generator for use in memory systems of digital computers.

Operation of high speed magnetic core memories requires a series of accurately timed pulses in which both the time between pulses and the duration of the pulses is accurately controlled in fractions of a microsecond. It has been the practice in the past to use a tapped delay line to which is applied an extremely sharp timing pulse. Various delays of the timing pulse are recovered by tapping off at selected points along the length of the delay line. The delayed pulses tapped off the delay line are then used to set and reset various flip-flops to derive pulses of the correct duration and timing sequence. However, the use of flip-flop circuits, particularly where the time intervals and pulse durations are extremely short results in a costly and a not always reliable timing circuit.

The present invention is directed to an improved circuit for generating a controlled sequence of timing pulses which can be easily controlled as to intervals between pulses and the duration of the pulses. This is accomplished by providing a tapped delay line to which is applied a step function voltage. For each output pulse from the timing circuit, a connection is made to two separate taps on the delay line, one connection being connected to one input of an AND gate and the other connection being through an inverter to the other input of the AND gate. If the step function is a rising voltage, the inverter connection is to the tap further down the delay line, whereas if the step function is a dropping voltage, the inverter is connected to the tap near to the input to the delay line.

Figure 1:
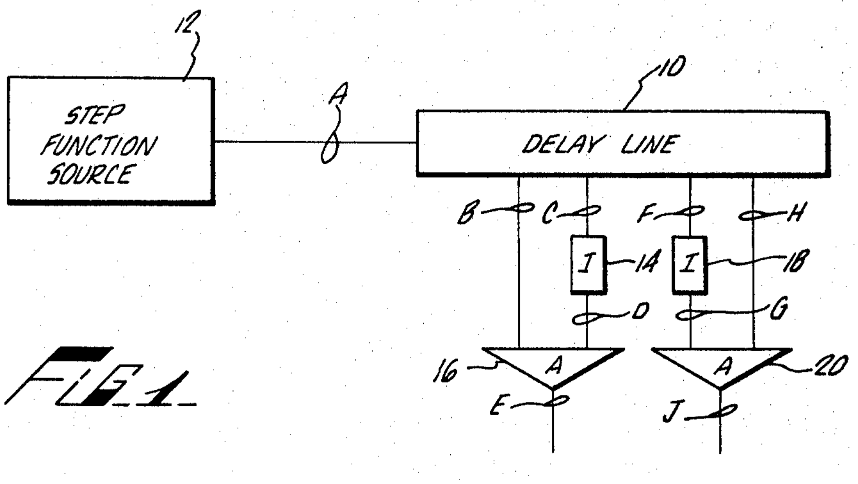
Figure 2:
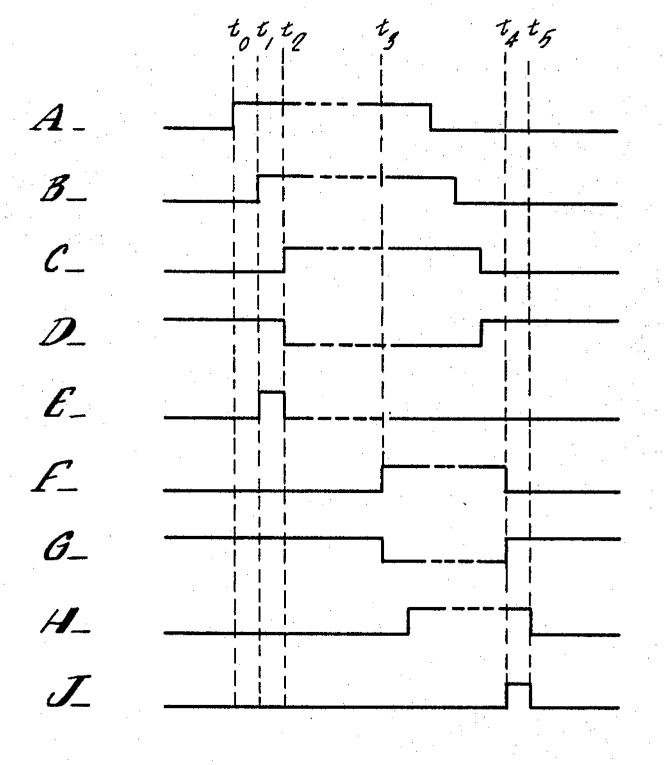

For a more complete understanding of the invention, reference should be made to the accompanying drawing wherein:

FIGURE 1 is a schematic block diagram of the circuit of the present invention; and FIGURE 2, A through J, is a series of waveforms used in explaining the operation of the invention.

Referring to FIGURE 1 in detail, the numeral 10 indicates generally a delay line of the conventional type providing distributed series inductance and shunt capacitance. The voltage level is changed at the input delay line by a step function voltage source 12. The source 12 may be means for generating rectangular pulses of relatively long duration, for example. The delay line is provided with a plurality of output taps distributed along the line, four of which are shown by way of example only.

According to the concept of the present invention, each output pulse from the timing circuit is derived from two of the output taps through a logic circuit including an inverter 14 and a logical AND circuit 16. Assuming positive logic, when the step function at the input A changes level in a positive direction, as shown at time $t_0$ in FIGURE 2A, at some delayed time interval later, the first output from the delay line produces a corresponding positive-going step function at the input of the AND gate 16, as shown at time $t_1$ in FIGURE 2B. At still a later time, a corresponding step function occurs at the next output of the delay line and at the input to the inverter 14, as shown at $t_2$ in FIGURE 2C. By virtue of the inverter circuit 14, the polarity of the step function is reversed so that a negative-going step function is applied to the second input of the AND gate 16 from the output of the inverter 14, as shown in FIGURE 2D. It will therefore be apparent that both inputs to the AND gate 16 are positive only during the interval from $t_1$ to $t_2$, producing an output from the AND gate 16, as shown in FIGURE 2E.

The duration of the pulse at the output of the AND gate 16 is determined by the delay between the two output taps on the delay line 10. The leading edge of the pulse at the output of the AND gate 16 is determined in time by the position of the tap along the delay line 10. Thus it will be seen that the time relation and the duration of the output pulse is controlled merely by selecting the position of the pair of output taps along the length of the delay line 10. By this technique overlapping pulses, pulses of different durations and pulses of different time delays can be obtained by selecting the proper taps on the delay line for each combination inverter and AND gate logic circuit producing an output pulse.

While different delay times can be obtained merely by using different tap positions along the delay line 10, part of the delay time may be derived by utilizing the negative-going step function occurring when the step function 12 returns to its initial level, e.g. the trailing edge of a rectangular input pulse. Thus considering the step function source 12 as generating a long rectangular pulse, the trailing edge of the signal from the source 12 can be used to generate a delayed pulse of short duration and selected time delay. This is accomplished by connecting the tap furthest from the input along the delay line 10 directly to an AND gate such as the AND gate 20 and connecting the tap closest to the input to the delay line through an inverter 18 to the other input of the AND gate 20. Thus as shown in FIGURE 2F, at time $t_4$, the voltage level changes in a negative direction at the output tap connected to the inverter 18. When inverted, this provides a positive-going step applied to one input of the AND gate 20 as shown in FIGURE 2G. From time $t_4$ to time $t_5$, both inputs to the AND gate 20 are positive so that a positive-going output is provided by the AND gate 20. When the trailing edge reaches the next tap on the delay line 10, the other input to the AND gate 20 goes negative and the output of the AND gate 20 goes negative producing a delayed pulse of short duration as shown in FIGURE 2J.

From the above description, it will be recognized that the present invention provides a circuit by means of which pulses of controlled duration and controlled delay intervals can be obtained without the use of flip-flops or other types of pulse generating circuits. A simple multitap delay line and logic circuitry is all that is required to produce accurately controlled timing pulses. The same delay line controls both the timing sequence and the time duration of the output pulses.

What is claimed is:

1. A timing circuit for generating a series of timing pulses comprising a tapped electrical delay line, means for abruptly changing the voltage level at the input to the delay line between a first and second level, at least one AND gate having a pair of inputs, one input being directly connected to one tap on the delay line, and an inverter connecting the other input to another tap on the delay line.

2. A timing circuit for generating a delayed pulse in response to a step function input signal comprising a tapped delay line, the step function signal being applied to the input of the delay line, an AND gate having a pair of inputs, one input being directly connected to a first tap on the delay line, and an inverter connecting the other input of the AND gate to a second tap on the delay line.

3. Apparatus as defined in claim 2 wherein the first tap is closer to the input to the delay line than the second tap.

4. Apparatus as defined in claim 2 wherein the second tap is closer to the input to the delay line than the first tap.

No references cited.

ARTHUR GAUSS, *Primary Examiner.*

S. D. MILLER, *Assistant Examiner.*